Patented Oct. 22, 1946

2,409,718

UNITED STATES PATENT OFFICE 2,409,718

COMPOSITION FOR CLEANING DENTURES

Foster Dee Snell, New York, and Kurt W. Haeseler, Forest Hills, N. Y., assignors to Foster D. Snell, Inc., a corporation of New York No Drawing. Application November 13, 1941,
Serial No. 419,028

2 Claims. (Cl. 252—106)

This invention relates to a composition for cleaning dentures.

In the cleaning of false teeth, supporting structures therefor, bridges, or like dentures, there are strict requirements to be met. It is necessary, for example, that the cleaning composition should penetrate the scale (plaque) of calcareous deposits, mucin, and other material accumulated on the dentures and disintegrate such scale to readily removable form, remove the loosened scale, destroy the odor of any stale saliva present, and disinfect the dentures, all without the necessity of abrasives or brushing. It is also necessary that the cleaning material in small proportions be non-toxic to humans but effective as a germicide. Also, it should be either practically tasteless and odorless or of pleasant taste and odor. For satisfactory distribution and use, it should be available in substantially non-caking, powder form, and dissolve with reasonable ease when added to water. The resulting aqueous solution must not alter the established color of the plate.

These requirements are more severe than for compositions to be used in cleaning natural teeth. Conventional compositions for natural teeth are preformed pastes, liquid solutions of surface-active agents, powders containing abrasive, etc. for application on a moist brush. Compositions for the two purposes are not satisfactorily interchangeable. In cleaning natural teeth, the teeth are invariably moist and brushing is employed. Artificial dentures are frequently dry and the deposits to be removed are more firmly placed due to such drying. The dentures are constructed of porcelain, rubber, plastic, or other materials that are entirely different from the calcium phosphate of the teeth and the live tissue of the gums.

The present invention provides a dry, non-caking powder that is quickly soluble in water, that meets the requirements set forth for a denture cleaner, and that will clean dentures during immersion for a quarter of an hour or so, without the use of any abrasive or brushing. The composition penetrates material caked or dried on the dentures, transforms it, loosens it, and then removes it from the dentures, and causes thorough disinfection. The composition is without bleaching effect on any part of the dentures, such as pink base plates, and does not cause deposition of salts from hard water used in dissolving the denture cleaning composition previous to use.

The composition of the invention which shows these properties comprises a disinfectant that is unique and for which we know of no alternative in our formula, namely, 2,2' dihydroxy 3,5,6-3',5',6' hexachlorodiphenylmethane in the form of one of its water soluble salts, a water soluble surface tension lowering agent, and a scale disintegrating material. Preferably the composition comprises an oxidizing agent that assists in destroying certain materials including bacteria and colored, staining materials.

In addition to the materials recited the composition may contain odor or taste establishing materials and a relatively large proportion of inert diluent such as salt.

The invention is illustrated by the composition shown in the following table, proportions here and elsewhere herein being expressed as parts by weight.

*Denture cleaning composition*

| Ingredient | Proportion | |
|---|---|---|
| | Range | Preferred |
| Sodium salt of 2,2' dihydroxy 3,5,6-3',5',6' hexachloro-diphenylmethane (disinfectant) | 0.5–2 | 0.7 |
| Sodium perborate (oxidizing agent) | 5–10 | 10 |
| Tetrasodium pyrophosphate (scale disintegrating material) | 20–70 | 50 |
| Sodium lauryl sulfo-acetate (surface tension lowering agent) | 1.5–5 | 2 |
| Tricalcium phosphate (anticaking agent) | 2–3 | 3 |
| Oil of peppermint (to establish odor) | 0.5–1 | 0.5 |
| Sodium chloride (diluent) | To make 100 parts total | |

The ingredients are mixed dry in any suitable manner, commonly with the tricalcium phosphate added last for greater effectiveness. Before being used, the mixture is dissolved in water, to give an aqueous solution containing about 2 parts of the mixture to 100 parts of water or other concentration desired.

To clean used dentures that are of average condition or slightly worse, it is necessary only to immerse the dentures in the aqueous solution for five to ten minutes. Warm water is usually used. In particularly obstinate cases the dentures are soaked overnight. During this immersion, the dissolved composition penetrates the film of calcareous deposit and mucin on the dentures and loosens not only that, but also other dirt particles. In addition, the composition destroys germs at such a rate and so effectively as to meet the Federal Food and Drug Administration specifications for an "antiseptic."

While particularly satisfactory results have been obtained with the composition described, alternative materials may be substituted for the various ingredients in the above table.

For the disinfectant any of the water soluble salts of 2,2' dihydroxy 3,5,6-3',5',6' hexachlorodiphenylmethane may be used, as for example, its sodium, potassium, or calcium salt. No other disinfectant has been found satisfactory.

In place of the sodium perborate as the oxidizing agent, there may be used other alkali metal perborates or water-soluble non-poisonous perborates of other metals. Thus, there may be used the perborates of potassium or ammonium, either alone or mixed with sodium perborate. Ammonium perborate, however, is somewhat too hygroscopic for most satisfactory general use. Considering properties and price, sodium perborate is the most advantageous perborate for the present purpose. The perborate has a bleaching effect upon films on the dentures.

The proportion of the selected perborate may be varied within rather wide limits. Proportions substantially in excess of ten per cent tend to introduce complications, due to caking of the compositions on long standing, without giving corresponding and fully offsetting advantages. Under some circumstances, however, it is found desirable to exceed the 10% specified. Amounts of sodium perborate less than 5 parts to 100 parts of the finished composition are not entirely satisfactory from the standpoint of the cleaning power of the whole composition.

The tetrasodium pyrophosphate used as the scale disintegrating agent may be replaced by other molecularly dehydrated complex phosphates such as sodium hexametaphosphate, sometimes known as Calgon or in a modified form as Calgonite, or by the compound known commercially as sodium tetraphosphate. In a different class as to satisfactoriness, but usable for some purposes are trisodium phosphate, sodium sesquicarbonate, or similar alkaline salts. Mixtures of the several salts may be used. Also, the metal combined in the salt selected may be either the sodium described or potassium, ammonium, or the like. The salt used must be soluble in water, stable, and free from objectionable effect upon the other ingredients of the cleaning composition.

It is considered that the complex phosphates such as tetraphosphate, hexametaphosphate, and the like disintegrate the scale chiefly by sequestering the alkaline earth metals such as calcium and magnesium present in the deposits on the denture. Trisodium phosphate, sodium sesquisilicate, and the like are considered to function largely by forming a precipitate of phosphate, silicate, and the like with such alkaline earth metals, thus liberating the organic radicals previously combined with the alkaline earth metals, these radicals combining with the alkali metal originally present in the phosphate or carbonate, to form alkali metal salts. Such complete chemical reformation disintegrates the scale or plaque so that it is readily removed, the complex phosphates serving this purpose especially effectively.

The proportion of the phosphate or the alternative therefor is suitably in the range of about 20 to 70 parts for 100 parts of the finished composition. Proportions larger than 70 parts lead to waste due to extra expense without compensating advantages, whereas amounts much less than 20 parts give imperfect cleansing of the dentures.

As the non-soap detergent or surface-tension lowering agent, there is used a water-soluble organic compound containing both lipophylic and hydrophylic groups, these groups being present in the same molecule, as, for example, the sodium lauryl sulfoacetate shown in the table, another alkali metal higher alkyl sulfate, or a sulfonic acid derivative of a higher alcohol. Thus, there may be used the sulfonic acid derivatives of alcohols containing 12 to 20 carbon atoms to the molecule, the said compounds before incorporation into our composition being suitably neutralized by alkali to the stage of being approximately neutral or slightly alkaline. Of the salts of the higher sulfates, there may be used, for instance, sodium dodecyl sulfate, sodium hexadecyl sulfate, or sodium octadecyl sulfate, the higher alkyls present in these compositions being either straight or branched chain and saturated or unsaturated, in accordance with commercial practice in the industry of non-soap detergents. Another detergent that may be used is the one known as sodium keryl benzene sulfonate.

The proportions of the non-soap detergents used are suitably the smallest amounts that will give approximately the minimum surface tension of water solutions when the cleaning composition is dissolved to give the aqueous solution of concentration suitable for use. Thus, there may be used about 1.5 to 5 parts of the non-soap detergent to 100 of dry weight of the whole composition.

The tricalcium phosphate in the composition tabulated above is representative of anti-caking agents. It minimizes the tendency of the composition to form itself into a compact mass, during storage before use. In place of the calcium phosphate for this purpose, there may be used powdered corn-starch, precipitated calcium carbonate, precipitated magnesium carbonate, or other material that is adapted to form a fine coating on particles that, on coming into contact with each other, would cake together. The tricalcium phosphate is preferred and gives outstanding results for this purpose.

The oil of peppermint establishes the flavor and odor. In place of the oil of peppermint or with it, there may be used methyl salicylate, pine oil derivatives, or other high boiling esters or essential oils of pleasing taste and odor.

The proportion of the flavoring material should be below that amount which, if used, would irritate the tissues of the mouth when the flavoring material is accidentally placed in the mouth in small proportion. On the other hand, the proportion of the flavoring material should not be so low as to lose its flavoring effect, in case such effect is desired in the composition.

The sodium chloride in the formula of the table serves largely as diluent. This salt may be replaced by other water-soluble materials that are non-toxic to human beings and without injurious effect upon the tissues of the body, the dentures, or upon other ingredients of the cleansing composition. Thus, there may be used in place of the sodium chloride such salts as sodium sulfate or potassium chloride.

In making the substitutions of the various alternative materials for those given in the table above, the substitution should be made on the basis of equal proportions. Thus, 1 part of the material shown in the table is replaced by approximately 1 part of the alternative material.

In a typical test, there was used the composition shown in the table above containing 0.7 part of the antiseptic to 100 parts dry weight of the composition and such a dilution with water as to give a solution containing 2.5 parts of the said composition to 100 parts of water. This solution tested for germicidal properties under standard conditions shows no growth after 5, 10, or 15 minutes. Under comparable conditions, phenol diluted with 80 times its weight of water permitted growth after 5 minutes' treatment but no growth after either 10 or 15 minutes.

It will be understood that the details given are for the purpose of illustration, not restriction, and that variations within the spirit of the invention are intended to be included in the scope of the appended claims.

What we claim is:

1. A denture cleaning composition comprising a dry free flowing powder of the following composition: sodium salt of 2,2' dihydroxy 3,5,6-3',5',6' hexachlorodiphenylmethane 0.5-2 parts, sodium perborate 5-10 parts, tetrasodium pyrophosphate 20-70 parts, sodium lauryl sulfo-acetate 1.5-5 parts, tricalcium phosphate 2-3 parts, and sodium chloride as diluent to make 100 parts total, all proportions being by weight.

2. A denture cleaning composition comprising a dry free flowing powder of the following composition: sodium salt of 2,2' dihydroxy, 3,5,6-3',5',6' hexachlorodiphenylmethane 0.5-2 parts as disinfectant, a water-soluble, non-toxic perborate 5-10 parts, an alkali metal molecularly dehydrated phosphate 20-70 parts, a powdered anticaking agent 2-3 parts, a surface tension lowering agent selected from the group consisting of higher alkyl sulfates and sulfonates 1.5-5 parts, and a non-toxic water soluble salt serving as a diluent in proportion to make 100 parts of the whole composition, all proportions being by weight.

FOSTER DEE SNELL.
KURT W. HAESELER.